June 7, 1960 L. A. ROSENTHAL 2,940,040
CONTINUOUS MEASURING APPARATUS AND METHOD
Filed Dec. 24, 1956 3 Sheets-Sheet 1

INVENTOR.
LOUIS A. ROSENTHAL
BY
ATTORNEY

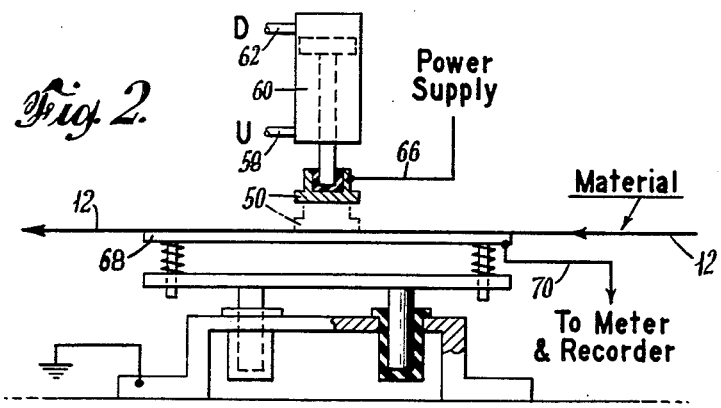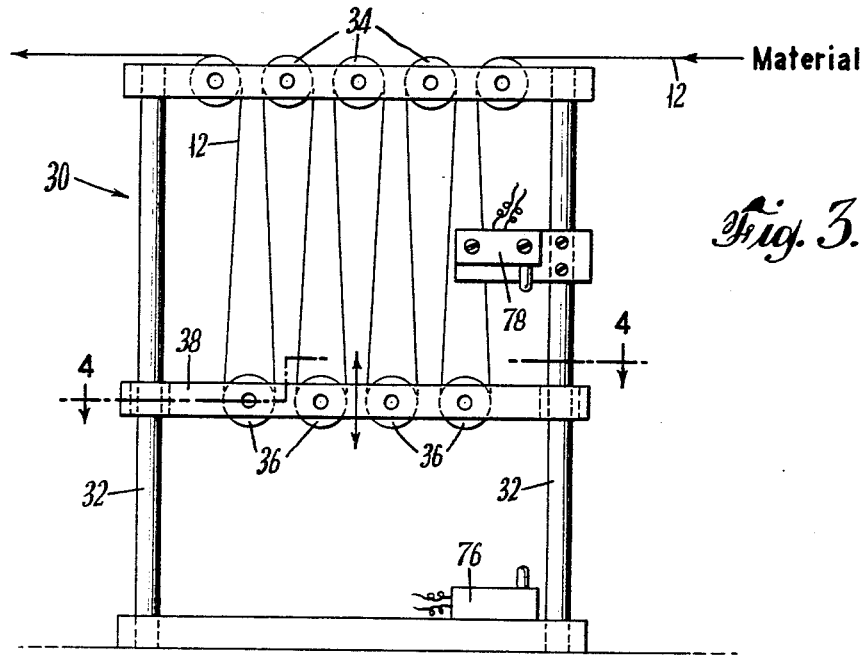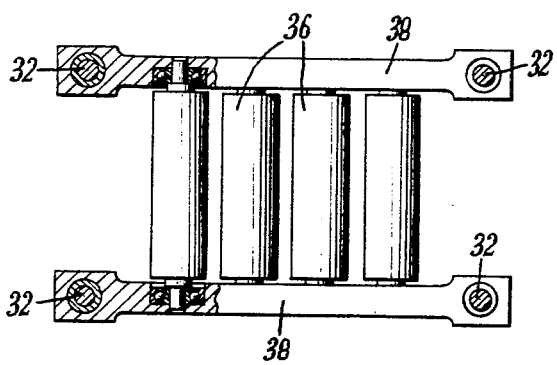

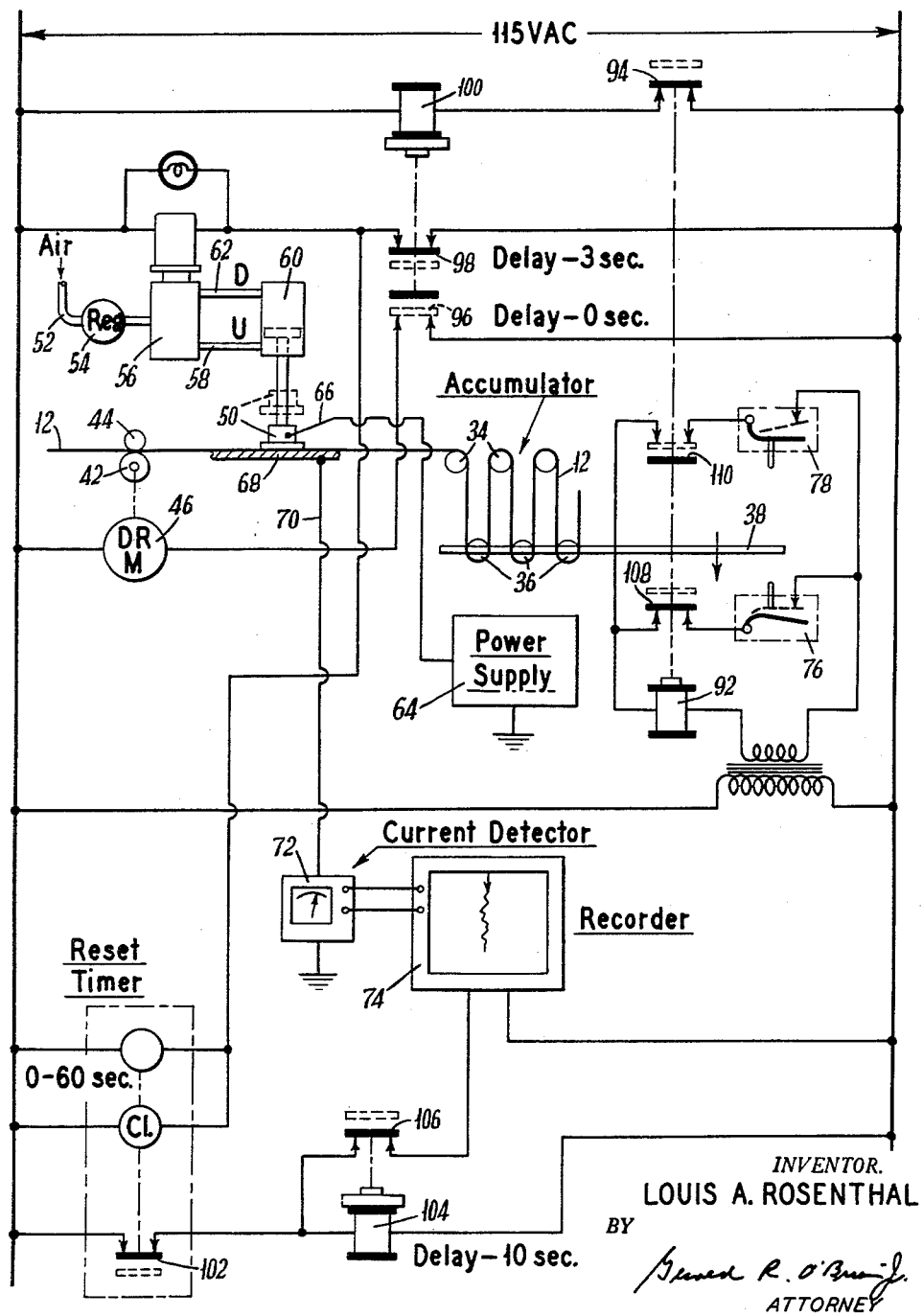

United States Patent Office 2,940,040
Patented June 7, 1960

2,940,040

CONTINUOUS MEASURING APPARATUS AND METHOD

Louis A. Rosenthal, Highland Park, N.J., assignor to Union Carbide Corporation, a corporation of New York Filed Dec. 24, 1956, Ser. No. 630,363

10 Claims. (Cl. 324—71)

The present invention relates to a continuous measuring apparatus and method and, more particularly, to such apparatus and method capable of measuring a physical property of material issuing in particulate or sheet or other form from a point in a production line and traveling at production speeds.

The quality of rubbers, plastics, paper, sheet, film, foil and many other materials is usually controlled by the frequent measurement during their manufacture of one or more of the physical properties germane to the end use for which the material is intended. For example, the direct current resistivity of plastic materials is often used for such quality control purposes since a minimum level of this property must generally be attained for many electrical applications, and because direct current resistivity is a sensitive index to the presence of contaminants or chemically-faulty constituents.

Heretofore, such materials were measured by periodically withdrawing samples from an appropriate point in the production line, e.g., from a bag-packing station, and taking said material to a testing laboratory. There, a small sample pressing was made from the particulate material and a test disc was die-cut from this pressing, placed in a mercury pool in an oven and its resistivity measured. A complete measurement required about 20–30 minutes.

Material is produced continuously at rates of the order of 2500 to 4000 pounds per hour. Consequently, such measurement lags the production line by at least 1250 to 2000 pounds. Actually, because of the additional time required to withdraw the sample, transport it to the testing station and return the result to the manufacturing area, it turns out that the measurement lags production by about 4000 pounds.

Accordingly, it is the main object of the present invention to provide a method and apparatus for the more rapid and more frequent measurement of such materials so that product changes are detected as soon as they occur and the expensive and wasteful production of large amounts of sub-standard material is avoided.

Other aims and advantages of the invention will be apparent from the following description and appended claims.

In accordance with the present invention, a method and apparatus is provided for measuring a physical property of a stream of particulate material or of a continuous sheet of material traveling at production speeds. The apparatus may comprise means for diverting a representative sample stream from the main production stream; means for forming the sample stream into a continuous specimen, e.g., a ribbon, having the dimensions and surface characteristics necessary for proper measurement of the physical characteristic to be determined; means for periodically measuring the physical characteristic of the traveling specimen; means for arresting the motion of the specimen at the measuring means during the measurement interval; means for periodically accumulating, between the forming means and measuring means, lengths of the specimen formed during the measurement interval to take up the slack in the traveling specimen due to its arrested motion at the measuring means; and conveying means for passing the continuous sample stream successively through the forming, accumulating and measuring means.

In some instances the diverting means and/or the forming means may be omitted. For example, if the production material issues in the form of a continuous sheet having the proper thickness and surface characteristics for measurement, then the accumulating means and measuring means is installed directly in the main production line. In this event, both the diverting and forming means may be omitted. If the width of the sheet made such a large accumulator impractical, the diverting means may be merely a slitter which separates a narrow ribbon from the edge of the main sheet and diverts the ribbon to the accumulating and measuring means. In this event, only the forming means is omitted.

The nature of the forming means depends on both the nature of the production material and on the physical characteristic being measured. For instance, if the production material were a continuous sheet having improper thickness or surface characteristics for measurement, the forming means might comprise, for example, a pair of planishing rolls or miniature calendering rolls or the like to provide any necessary thickness reduction, surface planishing or the like required. If the production material was granular or particulate, the forming means may comprise an extruder to provide a ribbon-like specimen, as illustrated in the specific embodiment described in the specification; or it may comprise an extruder and planishing or calendering or other means necessary to provide special surface characteristics, e.g., exceptional smoothness, gloss or the like, which may be required for proper measurement of a particular physical property.

The accumulating means may comprise a frame member supporting a fixed plurality of upper rollers and a slidable plurality of lower rollers between which the continuous specimen is alternately threaded so that lengths of the specimen accumulate in the accumulating means by the lowering of the slidable plurality of lower rollers as the outlet speed of the specimen is reduced; and contact means positioned at least at a lower location with respect to the slidable plurality of rollers for actuating the conveying means to increase the outlet speed of the specimen when the slidable plurality of rollers descends to the lower location. The slidable plurality of rollers may alternatively be actuated by forces other than gravity, such as spring loading and the like, to provide slidable movement in other than the vertically downward direction.

The following description of the invention will have reference to the specific embodiment of apparatus shown in the drawings, wherein:

Fig. 2 is an elevational view, partly in section, of the measuring means employed in the apparatus of Fig. 1;

Fig. 3 is an elevational view of the accumulating means employed in the apparatus of Fig. 1;

Fig. 4 is a plan view, partly in section, taken along the line 4—4 of Fig. 3; and Fig. 5 is an electrical circuit diagram of the control apparatus employed in the apparatus of Fig. 1.

Figure 1:
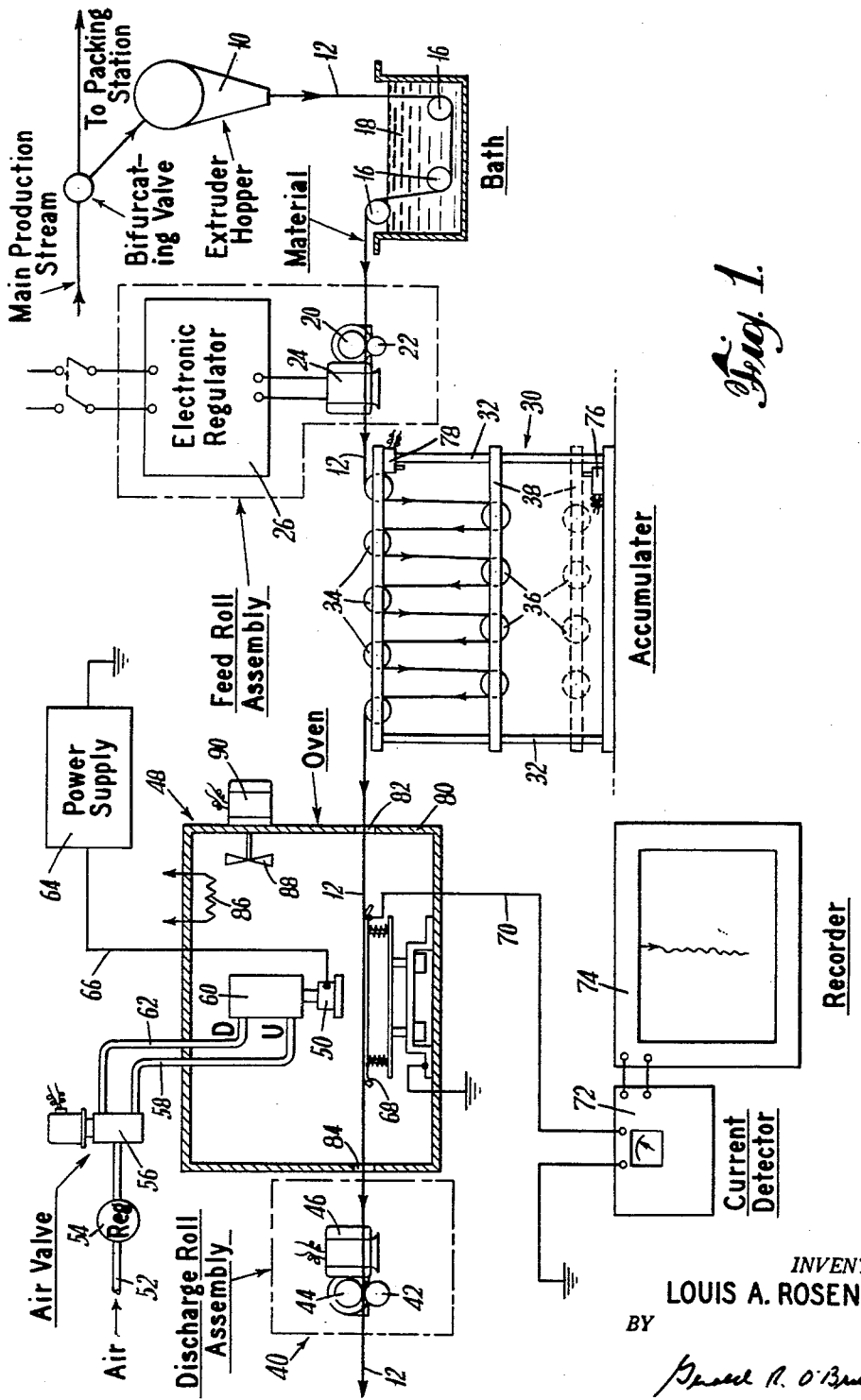
Fig. 1 is a schematic elevational view of the continuous measuring apparatus.

Referring specifically to Figs. 1 through 4 of the drawing, a representative sample stream of material may be diverted continuously from the main particulate production stream by a bifurcating valve and directed into the hopper of extruder 10. The extruder 10 provides a continuous specimen in ribbon form 12 which is pulled over a series of rollers 16 through a suitable bath 18 by feed rollers 20 and 22 driven by a variable speed motor 24 which is controlled by electronic regulator 26 to provide a constant and regulated feeding speed. The feed rollers pull the material from the extruder 10; and the speed of the feed rollers partially establishes the dimensions of the material specimen 12 and the timing for the entire measurement cycle.

The passage of the extruded sheet material through a cooling bath 18 has been found necessary since the material leaving the extruder is hot and weak and, upon cooling, it can be conveniently handled.

Since the measurement is periodic, while the formation of test specimen is continuous, there is provided means for the accumulation of material during that period of time during which the measurement is made. This is accomplished through the operation of accumulator assembly 30 which comprises a frame member 32 a fixed plurality of upper roller members 34 and a slidably mounted plurality of lower rollers 36.

The ribbon of material 12 is alternately threaded over roller members 34 and 36, as shown in Fig. 1 of the drawing, and rigid sliding member 38, supporting lower roller members 36, raises and lowers in frame member 32, the weight of this member keeping the accumulated material taut. As the sliding member 38 moves down a distance "x," the accumulator stores or accumulates a total length of material "nx," where "n" is the number of vertical passes of material 12 suspended between roller means 34 and 36.

As slack in the traveling material ribbon 12 is taken up in accumulator means 30, the material discharge roll assembly 40, comprising driving rollers 42 and 44, driven by motor 46, is de-energized to stop the passage of sheet material 12 through measuring means assembly 48.

At this time a pneumatic control system is actuated to lower the movable electrode 50 of measuring means 48 into contact with the sheet material 12.

The pneumatic control system comprises a compressed air supply conduit 52, provided with a pressure regulator 54, supplying regulated compressed air to double acting, solenoid-actuated valve 56. During the non-measuring portion of the cycle, valve 56 is actuated to permit the passage of air through conduit 58 to raise movable electrode 50, slidably mounted in piston valve head 60. During the measuring portion of the cycle, valve 56 is actuated to permit the passage of air through conduit 62 to lower movable electrode 50 into contact with the sheet of material 12 to be measured.

The resistivity measuring circuit is thus completed from the power supply 64 and successively through line 66, electrode 50, the sheet of material 12, stationary base electrode 68, line 70 and current detecting means 72 to ground. Suitable electrical recorder means 74 is actuated by detecting means 72 to provide a written resistivity measurement record.

Two limit switches 76 and 78 are positionably mounted on the accumulator frame to control the basic timing cycle of the repeating operation. When the accumulator is full so that the movable roller frame 38 is approaching the base of frame member 32, the lower limit switch 76 is tripped and the clamped upper electrode of the measuring means is lifted while the discharge roll assembly 40 empties out the accumulator. The emptying out of the accumulator lifts up the movable roller frame 38 of the accumulator until the upper limit switch 78 is hit, whereupon the discharge motor 46 stops and the electrode 50 contacts the specimen after a short delay. The position of at least one of the limit switches 76 and 78 is adjustable to control the measurement period. Decreasing the distance between the switches shortens the cycle, i.e., provides more frequent measurements; and vice versa. Thus the rate of measurement is automatically determined by the rate at which the accumulator fills and the setting of the limit switches 76 and 78.

The measuring means 48 comprises an outer housing or oven 80 which is provided with inlet port 82 and outlet port 84 for the passage of sheet material 12 therethrough. In its passage through oven 80, the material passes in contact with and is supported by the lower electrode 68 of the measuring apparatus, and movable electrode 50 is slidably mounted above the material. The interior of measuring means 48 is maintained at a controlled temperature, for example 50° C., by means of thermostatically controlled resistance elements 86 and a fan 88, driven by motor 90, positioned therein. It has been found necessary to maintain the interior of the measuring means at a constant regulated temperature since many of the physical characteristics of the material to be measured vary with temperature.

The sequence of operation of the apparatus of the invention will now be described with respect to Fig. 5 of the drawings.

The 115-volt line is converted to 6 volts for the upper limit microswitch 78 and lower limit microswitch 76. These exposed switches are operated for safety reasons at low voltages. The two microswitches are in tandem with a latching relay 92 to prevent setting the mechanism out of synchronism. For example, if the lower switch 76 is hit, then it is thereafter disconnected from the circuit while the upper one 78 is made active in anticipation of the accumulator being emptied. When the upper limit switch 78 is hit, contacts 94 close and time delay relay 100 is energized, whereupon contacts 96 (which are normally closed) open and the discharge roll motor stops with zero time delay, and three seconds later contacts 98, which are also on time delay relay 100, close. When contacts 98 close, the solenoid valve 56 operates the pneumatic system bringing down the electrode 50 and a reset timer starts operating. This reset timer consists of two parts, a motor and a clutch which are both started together. One minute after the reset timer has been energized, contacts 102 close and start the recorder operating. The recorder is in series with another normally closed relay 104 through contacts 106. After 10 seconds have passed the switch 106 is opened and the recorder is out of the circuit. All during this time the contacts 108 on the latching relay were closed anticipating the closure of the lower microswitch 76, when the accumulator is full.

When 76 closes, the latch relay advances, contacts 108 open, contacts 110 close (ready for the next portion of the cycle), and contacts 96 close to start the discharge rollers. Contacts 96 are normally closed when the relay 100 is not energized. The discharge rollers continue to operate until the upper microswitch 78 is tripped, whereupon contacts 108 close, contacts 96 open, and contacts 98 close after a delay. The entire cycle is then repeated for the next periodic measurement.

In an example of the practice of one aspect of the invention, a portion of a main production stream of granulated plasticized vinyl chloride-vinyl acetate copolymer composition traveling at a rate of 3500–4000 pounds per hour was diverted to apparatus similar to that shown in the embodiment of the drawing.

The diverted material was continuously fed to the extruder hopper at a rate of about 4 pounds per hour where it was extruded into a specimen ribbon approximately 3 inches by 0.02 inch in size and traveling at a speed of about 165 feet per hour.

D.C. resistivity measurements of the sample ribbon were made with a frequency of measurement of about 85 seconds and a 75 second period of actual measurement. The electrode employed for measurement was 1½ inches in diameter. An average measurement of resistance over a 35 minute period was $3.33 \times 10^{10}$ ohms, corresponding to a D.C. resistivity of 3.3 megohm-cm.

The accumulating means employed in this example contained 5 fixed rolls, 4 movable rolls and had a nominal storage capacity of about 170 inches, although only a fraction of that capacity was utilized in this example.

Whereas the apparatus of the invention has been described hereinabove with respect to the embodiment as shown in the figures of the drawing, wherein a measurement of the direct current resistivity of the production material is effected, the apparatus of the invention in its broadest aspects may be employed to measure other electrical properties of the material, such as dielectric constant, power factor and dielectric strength; optical properties, such as color, light transmission, reflectance and light (visible, ultraviolet and infra-red) absorption; and mechanical properties such as hardness, plasticity, and the like, as long as the combination of periodic measurement and accumulation of test material between the forming means and the measuring means is effected during the measurement period.

Similarly, other variations in specific elements of the apparatus incorporated in the measuring means may be employed without departing from the broad aspects of the invention. For example, for a measurement of dielectric constant and/or power factor, a portion of the sheet material passing through the measuring apparatus can be made to serve as one arm of a self-balancing conventional alternating current bridge. For the measurement of color and light transmission, a light source can be provided in the measuring apparatus and a detector unit employed to measure the light transmission (infra-red spectra analysis). For plasticity measurement, the electrode assembly of the embodiment described hereinabove can be replaced with a weight and deflectometer so that the material will deform with time and a recording of the deformation can be made using a deflectometer to provide a deformation-versus-time curve. For dielectric breakdown strength, the electrode assembly of the embodiment of the drawing can be employed and the voltage increased in steps or continuously until breakdown occurs.

While the continuous measuring apparatus of the invention has been described hereinabove with respect to the measurement of plastic material it is, of course, to be understood that the invention in its broader aspects applies equally to the measurement of a physical property of a wide variety of other materials, such as paper, cloth, metal foil, wire insulation and the like.

What is claimed is:

1. The method of measuring a physical property of material traveling in particulate form from a point of production at production speeds comprising diverting at least a portion of material from the production stream, forming said portion of material into a continuum of material, continuously feeding said continuum from the point of formation toward a point of measurement periodically arresting and measuring a physical property of said continuum while concurrently accumulating the build up of said continuum between the point of formation and the point of measurement, and rapidly passing said accumulation of continuum past the point of measurement between the times of said periodic measurements.

2. The method of measuring a physical property of a continuous sheet of material traveling from a point of production at production speeds comprising separating at least a portion of said sheet of material along an edge thereof, continuously feeding said edge portion from the point of formation toward the point of measurement periodically arresting and measuring a physical property of said edge portion material while concurrently accumulating the build up of said edge portion between the point of separation and the point of measurement, and rapidly passing said accumulated build up of material past said point of measurement between the times of said periodic measurements.

3. Apparatus for measuring a physical property of a continuum of material traveling at forming speeds comprising means for periodically measuring a physical property of said continuum; means for periodically accumulating, between the points of production and of measurement, lengths of said continuum during the measurement interval to take up the build up of said continuum due to the arrested motion of said continuum through said measuring means; and conveying means for continuously feeding said continuum, from said point of forming, toward said measuring means through said accumulating means.

4. Apparatus in accordance with claim 3, wherein said accumulating means comprises a frame member supporting a fixed plurality of rollers and a slidable plurality of rollers between which said continuum is alternately threaded so that lengths of said continuum accumulate in said means by the relative movement between said slidable plurality of rollers with respect to said fixed plurality of rollers as the outlet speed of said continuum is reduced; and contact means positioned with respect to said slidable plurality of rollers for actuating said conveying means to increase said outlet speed of said continuum when said slidable plurality of rollers moves to actuate said contact means.

5. Apparatus for measuring a physical property of a stream of particulate material traveling at production speeds comprising means for diverting a portion of said particulate material from said stream; means for forming said diverted particulate material into a continuum of material; means for periodically measuring a physical property of said continuum; means for periodically accumulating, between the points of forming and of measurement, lengths of said continuum during the measurement interval to take up the build up of said continuum due to the arrested motion of said continuum through said measuring means; and conveying means for continuously feeding said continuum, from said point of forming, successively through said accumulating means toward said measuring means.

6. Apparatus in accordance with claim 5, wherein said accumulating means comprises a frame member supporting a fixed plurality of rollers and a slidable plurality of rollers between which said continuum is alternately threaded so that lengths of said continuum accumulate in said means by the relative movement between said slidable plurality of rollers with respect to said fixed plurality of rollers as the outlet speed of said continuum is reduced; and contact means positioned with respect to said slidable plurality of rollers for actuating said conveying means to increase said outlet speed of said continuum when said slidable plurality of rollers moves to actuate said contact means.

7. Apparatus for measuring a physical property of a continuous sheet of material traveling at production speeds comprising means for continuously separating a strip from the edge of said sheet; means for periodically measuring a physical property of said traveling strip of material; means for periodically accumulating, between the points of production and of measurement, lengths of said strip of material during the measurement interval to take up the build up of said traveling strip due to the arrested motion of said strip through said measuring means; and conveying means for continuously feeding said continuous strip of material, from said point of separation, successively through said accumulating means toward said measuring means.

8. Apparatus in accordance with claim 7, wherein said accumulating means comprises a frame member supporting a fixed plurality of rollers and a slidable plurality of rollers between which said strip is alternately threaded so that lengths of said strip accumulate in said means by the relative movement between said slidable plurality of rollers with respect to said fixed plurality of rollers as the outlet speed of said strip is reduced; and contact means positioned with respect to said slidable plurality of rollers for actuating said conveying means to increase said outlet speed of said strip when said slidable plurality of rollers moves to actuate said contact means.

9. The method of periodically measuring a physical property of a continuum of material which comprises continuously feeding said continuum from a point of origin toward a point of measurement, interrupting the travel of said continuum at the point of measurement and holding the portion of the continuum to be measured stationary during the course of the measurement while concurrently accumulating the build up of said continuum between said point of origin and said point of measurement, and rapidly passing said accumulated material past said point of measurement between the times of said periodic measurement.

10. The method of periodically measuring a physical property of a continuous sheet of material which comprises continuously feeding said sheet from a point of origin toward a point of measurement, interrupting the travel of said sheet at the point of measurement and holding the portion of the sheet to be measured stationary during the course of the measurement while concurrently accumulating the build up of said sheet between said point of origin and said point of measurement, and rapidly passing said accumulated sheet past said point of measurement between the times of said periodic measurement.

References Cited in the file of this patent

UNITED STATES PATENTS

| | | |
|---|---|---|
| 1,606,305 | Leguillon | Nov. 9, 1926 |
| 2,259,517 | Prenkard | Oct. 21, 1941 |
| 2,280,943 | Ferm | Apr. 28, 1942 |
| 2,351,229 | Potts | June 13, 1944 |
| 2,494,402 | Mursch | Jan. 10, 1950 |
| 2,528,342 | Cuckler | Oct. 31, 1950 |